United States Patent Office

3,646,169
Patented Feb. 29, 1972

3,646,169
SULFUR VULCANIZABLE ELASTOMERIC BLENDS COMPRISING DIOLEFIN RUBBER AND EPDM TERPOLYMERS
Kenneth H. Wirth, Baton Rouge, La., assignor to Copolymer Rubber & Chemical Corporation, Baton Rouge, La.
No Drawing. Continuation-in-part of application Ser. No. 548,614, May 9, 1966, now Patent No. 3,492,370. This application Jan. 22, 1970, Ser. No. 5,117
Int. Cl. C08f 29/12, 41/12; C08d 9/08
U.S. Cl. 260—889                                      26 Claims

ABSTRACT OF THE DISCLOSURE

This invention relates to sulfur vulcanizable blends prepared from a diolefin rubber and an interpolymer comprising ethylene, at least one straight chain monoolefin containing 3–16 carbon atoms and a polyunsaturated bridged ring hydrocarbon containing at least one ethylenic double bond in one of the bridged rings. The blends are particularly useful as adhesives in the preparation of rubber laminates.

---

This is a continuation-in-part of copending application Ser. No. 548,614, filed May 9, 1966 and entitled "Sulfur Vulcanizable Elastomeric Blends Comprising Diolefin Rubber and EPDM Terpolymers" now U.S. Patent 3,492,370.

This invention relates to novel sulfur vulcanizable elastomeric blends prepared from highly unsaturated hydrocarbon rubbers and rubbers characterized by a relatively low degree of unsaturation, prepared by interpolymerization of a monomeric mixture containing ethylene, at least one monoolefin having from 3–16 carbon atoms, and a 5-alkylidene-2-norbornene in which the alkylidene group has at least two carbon atoms. The invention still further relates to the sulfur vulcanized or otherwise cured elastomeric blends and laminates prepared in accordance with the invention.

Natural rubber and highly unsaturated synthetic hydrocarbon rubbers such as styrene-butadiene rubber, cis-1,4-polybutadiene, and cis-1,4-polyisoprene are employed in the manufacture of a wide variety of rubber articles. However, these rubbers are subject to rapid attack by elemental oxygen and especially ozone, and they have disadvantages when used in applications where resistance to oxidative degeneration is imortant. The resistance to oxidation can be improved somewhat by the addition of antioxidants. However, this increases the cost of the rubber and also many of the antioxidants are staining.

It is known that oxidation resistant elastomers may be prepared by interpolymerizing a monomeric mixture composed of ethylene and at least one higher straight chain alpha monoolefin in solution in an organic solvent and in the presence of a Ziegler polymerization catalyst. However, the resulting saturated elastomers are not sulfur vulcanizable and substances other than sulfur must be used for curing purposes, such as the organic peroxides. Efforts have been made to provide a low degree of ethylenic unsaturation by including a reactive monomeric polyolefin in the mixture of straight chain alpha monoolefins to be polymerized. The resulting interpolymers contain about 2–5 carbon-to-carbon residual double bonds per 1000 carbon atoms, and they may be readily cured with sulfur following prior art practices. The resulting vulcanized elastomeric products have excellent ozone resistance and are not subject to rapid oxidative degeneration.

In the interest of simplifying the discussion, the sulfur curable elastomers prepared by interpolymerizing a monomeric mixture containing ethylene, a higher monoolefin containing 3–16 carbon atoms and a 5-alkylidene-2-norbornene may be referred to herein as ethylene-propylene-diolefin monomer (EPDM) rubbers, as this represents the presently preferred monomeric mixture. However, when this term is used it is understood that interpolymerizable straight chain monoolefins containing 4–16 carbon atoms may be substituted for at least part of the propylene, and that interpolymerizable polyolefins in general may be substituted for all or part of the diolefin monomer.

It was reasoned heretofore that blends prepared from the highly unsaturated hydrocarbon rubbers mentioned above and the relatively low unsaturated sulfur vulcanizable EPDM rubbers should have a combination of good ozone resistance and good physical properties in the vulcanized state. However, this is not the case, as the prior art blends invariably have markedly lower physical properties. The EPDM rubber acts as a filler and it is not covulcanized to produce a product which has physical properties approximating those of the highly saturated hydrocarbon rubber alone. The art has long sought an entirely satisfactory EPDM rubber which will covulcanize readily with the highly unsaturated hydrocarbon rubbers, to thereby provide the desirable combination of good ozone resistance and high physical properties in the resulting vulcanizates.

The incompatibilty of highly unsaturated hydrocarbon rubbers and the EPDM rubbers used in the prior art has prevented the preparation of entirely satisfactory laminates therefrom. For instance, it has not been possible prior to the present invention to tightly adhere a lamina of the highly unsaturated hydrocarbon rubbers to a lamina of EPDM rubber in a convenient and satisfactory manner, and with the resulting bond having a strength which is comparable with that of the individual rubbers. As a result, the bond ruptures and the various laminae separate when the laminate is subjected to stress and strain during use. This problem of the prior art has been especially troublesome in the manufacture of certain reinforced rubber articles having an essentially laminated structure, such as pneumatic tires, high pressure hoses and heavy conveyor belts, where during the manufacturing steps sulfur vulcanizable rubber laminae are superimposed one on the other and then tightly adhered together during the vulcanizing step. The various laminae in the unvulcanized article must bond together sufficiently prior to the vulcanizing step to allow it to be assembled and handled. It has been impractical to construct pneumatic tires from EPDM rubber prior to the present invention due to the combination of the lack of surface tack., i.e., the inability of the various uncured rubber laminate to bond sufficiently in the initial green state to enable the unvulcanized article to be readily constructed and handled prior to the vulcanizing step, and the incompatibilty of EPDM with tackifying agents such as natural rubber and/or cis-1,4-polyisoprene. The present invention also overcomes the above disadvantages and shortcomings of the prior art laminating processes which use EPDM rubber in an entirely satisfactory manner for the first time.

It is an object of the present invention to provide novel sulfur vulcanizable blends of highly unsaturated hydrocarbon rubbers, EPDM rubbers, and the vulcanizates prepared therefrom.

It is a further object to provide novel tackifying and adhesive compositions which are especially useful in constructing laminates from laminae of highly unsaturated hydrocarbon rubbers and EPDM rubbers.

It is a still further object to provide a novel method of preparing laminated rubber articles from laminae including highly unsaturated hydrocarbon rubbers and EPDM rubbers, and the laminates thus prepared.

It is still a further object to provide a novel method of manufacturing pneumatic tires from EPDM rubber, and the pneumatic tires thus prepared.

Still other objects and advantages of the invention will be apparent to those skilled in the art upon reference to the following detailed description and the accompanying examples.

The sulfur vulcanizable elastomeric blends of the invention may contain about 5–95% by weight of the highly unsaturated hydrocarbon rubber, and about 95–5% by weight of the special EPDM rubber described hereinafter. Unexpectedly, the rubbers in such blends have been found to covulcanize, and the EPDM rubber does not act as a filler as in the prior art compositions. Thus, the physical properties of the resulting vulcanizates are not degraded to the extent that is true of the prior art blends. In instances where it is desired to impart outstanding ozone resistance to the blend, then the EPDM rubber should be present in an amount of at least 15% by weight, and preferably in an amount of about 15–30% by weight.

In instances where the blend is to be used as a tackifying agent and adhesive, it is preferred that the blend contain about 20–70% of natural rubber or cis-1,4-polyisoprene and about 80–30% by weight of the EPDM rubber. Better results are often obtained when the blend contains 20–50% by weight of the natural rubber or cis-1,4-polyisoprene, and 80–50% by weight of the EPDM rubber. Natural rubber is usually preferred in preparing blends to be used as a tackifying agent. Such blends are especially effective when dissolved in an organic hydrocarbon solvent or chlorinated hydrocarbon solvent for rubber, and when the resulting cement is used as a tackifying agent or a coating agent in the manufacture of pneumatic tires. The solvent may be any suitable nonviscous solvent for rubber, including hydrocarbons containing, for example, 5–10 carbon atoms and halogenated hydrocarbons containing 1–8 carbon atoms. The polymerization solvent described hereinafter for use in preparing the EPDM rubber is satisfactory and may be used. The various blends described above also may be used in their solid state as an adhesive agent.

Representative examples of the highly unsaturated hydrocarbon rubbers for use in preparing the blends include natural rubber, butadiene-styrene rubbers (SBR) and especially those containing less than 50% by weight of bound styrene, isoprene rubber (IR), butadiene rubber (BR), and styrene-isoprene rubber (SIR). The preferred IR and BR rubbers are cis-1,4-polybutadiene and cis-1,4-polyisoprene, respectively, having a cis-1,4-addition of at least 90%. SBR is preferred for many commercial applications, such as in the manufacture of pneumatic tires.

The preparation and properties of the foregoing rubbers are well known and are described in a large number of issued United States patents and other publications, including the following: Introduction to Rubber Technology, edited by M. Morton, Reinhold Publishing Corporation, New York (1959); Synthetic Rubber Technology, volume I, by W. S. Penn, Maclaren and Sons, Ltd., London (1960); Rubber, Fundamentals of Its Science and Teconology, J. Le Bras, Chemical Publishing Company, Inc., New York (1957); and Linear and Stereoregular Addition Polymers, N. G. Gaylord et al., Interscience Publishers, New York (1959). Typical commercially available elastomers of the foregoing types are described in the text "Compounding Ingredients for Rubbers," 3rd edition, Cuneo Press of New England, Cambridge, Mass. The above publications are incorporated herein by reference.

The EPDM elastomers used in preparing the blends of the invention are the products resulting from interpolymerizing a monomeric mixture containing ethylene, at least one other straight chain alpha monoolefin containing 3–16 carbon atoms, and a polyunsaturated bridged-ring hydrocarbon having at least one carbon-to-carbon double bond in a bridged ring, in solution in an organic polymerization solvent and in the presence of a Ziegler catalyst. In general, the basic reaction conditions may be the same as those employed in the prior art for preparing EPDM rubbers, except that a much larger amount of the bridged ring compound is reacted to thereby produce a highly unsaturated EPDM rubber.

In the aforementioned parent application description is made of the use of an EPDM rubber in which the interpolymer is formed of ethylene and propylene or other monoolefin containing from 3–16 carbon atoms in a molar ratio of 80:20 to 20:80 of ethylene to propylene in the combined elastomer and in which the third monomer in the form of a 5-alkylidene-2-norbornene is present in an effective unsaturation level of at least 7 and preferably 7–25 carbon-to-carbon double bonds per 1000 carbon atoms in the total polymer.

It has now been found that blends having unexpected improvements in tensile strength, elongation and modulus with reduced compression set can be produced with the EPDM rubber blended when the uncured highly unsaturated hydrocarbon rubber is formulated to embody a molar ratio of ethylene to propylene which exceeds 80:20 but is less than a molar ratio of 95:5 ethylene to propylene and preferably in the ratio of 80:20 to 90:10. Under these conditions, the amount of effective unsaturation derived from the third monomer of 5-alkylidene-2- norbornene, in which the alkylidene group contains at least 2 carbon atoms, can be less than 7 carbon-to-carbon double bonds per 1000 carbon atoms and, in fact, may be as low as 2 carbon-to-carbon double bonds per 1000 carbon atoms and may range up to 60 or more, and preferably within the range of 2–25 carbon-to-carbon double bonds per 1000 carbon atoms without interfering with the cocurability between the EPDM rubber and the highly unsaturated hydrocarbon rubber in the blend.

It has also been found that within the previously described range of 80:20 to 20:80 moles of ethylene to propylene bound in the EPDM rubber, good blendability without interfering with the cocure during cure or sulfur vulcanization can be achieved when the amount of third monomer is reduced to provide an effective unsaturation of less than 7 but more than 2 carbon-to-carbon double bonds per 1000 carbon atoms of the polymer when the third monomer is limited to 5-alkylidene-2-norbornene in which the alkylidene group contains from 2–20 carbon atoms such as 5-propylidene-2-norbornene, 5-butylidene-2-norbornene, 5-heptylidene-2-norbornene, 5-isopentylidene-2-norbornene, 5-dodecylidene-2-norbornene, and preferably 5-ethylidene-2-norbornene.

In instances where it is desired to prepare a tetrapolymer, or a polymer from more than five different monomers, then one or more alpha monoolefins containing 4–16 carbon atoms may be substituted for an equal molar quantity of bound propylene in the above-mentioned monomer compositions. When preparing tetrapolymers, the range of the fourth monomer will normally be about 5–20 mol percent.

The polymerization solvent may be any suitable inert or saturated hydrocarbon which is liquid and relatively non-viscous under the reaction conditions, including the prior art solvents for the solution polymerization of monoolefins in the presence of a Ziegler catalyst. Examples of satisfactory hydrocarbon solvents include open chain saturated hydrocarbons containing 5–8 carbon atoms, of which hexane is usually preferred; aromatic hydrocarbons and especially those containing a single benzene nucleus such as benzene or toluene; and saturated cyclic hydrocarbons which have boiling ranges approximating those for the open chain and aromatic hydrocarbons discussed above, and especially saturated cyclic hydrocarbons containing 5 or 6 carbon atoms in the ring. The solvent may be a mixture of one or more of the foregoing hydrocarbons, such as a mixture of aliphatic and naphthenic hydrocarbon isomers having approximately the same boiling range as normal hexane. It is necessary that the solvent be dry and free of substances which will interfere with the Ziegler catalyst.

Ziegler catalysts in accordance with the prior art may be used in preparing the EPDM elastomer. In general, any suitable prior art Ziegler-type catalyst may be used which is known to produce a satisfactory elastomer. Ziegler catalysts are disclosed in a large number of issued patents, such as U.S. Pats. Nos. 2,933,480, 3,093,620, 3,093,621, 3,211,709 and 3,113,115. Examples of Ziegler catalysts include metal organic coordination catalysts prepared by contacting a compound of a metal of Groups IV$a$, V$a$, VI$a$ and VII$a$ of the Mendeleef periodic chart of the elements, as typified by titanium, vanadium, and chromium halides, with an organometallic compound of a metal of Group I, II or III of the Mendeleef periodic chart which contains at least one carbon-metal bond, as typified by trialkyl aluminum and alkyl aluminum halides wherein the alkyl groups contain 1–20 and preferably 1–4 carbon atoms.

The preferred Ziegler catalyst for many polymerizations is prepared from a vanadium compound and an alkyl aluminum halide. Examples of suitable vanadium compounds include vanadium trichloride, vanadium tetrachloride, vanadium oxytrichloride, vanadium acetylacetonate, etc. Activators which are especially preferred include alkyl aluminum chlorides of the general formulae $R_3AlCl_2$ and $R_2AlCl$, and the corresponding sesquichlorides of the general formula $R_3Al_2Cl_3$, wherein R is a methyl, ethyl, propyl, butyl or isobutyl radical. A catalyst prepared from methyl or ethyl aluminum sesquichloride and vanadium oxytrichloride is especially preferred, and when using this catalyst, the optimum ratio of the catalyst components is usually 1 mol of vanadium oxytrichloride for each 12–20 mols of the alkyl aluminum sesquichloride.

The blend may be cured following prior art procedures, and special curing techniques are not necessary. As a general rule, a curing procedure which is normally followed in curing the highly unsaturated hydrocarbon rubber component is also satisfactory in curing the blend. Various curing procedures, including the materials and the quantities thereof to be employed, are described in a large number of publications which are well known in the art. These publications include those previously mentioned. Additional publications include Principles of High Polymer Theory and Practice, Schmidt et al., McGraw-Hill Book Company, New York (1948); Chemistry and Technology of Rubber, Davis et al., Reinhold Publishing Corporation, New York (1937); The Applied Science of Rubber, edited by W. J. S. Naunton, published by Edward Arnold, Ltd., London (1961), and the Encyclopedia of Chemical Technology, Kirk and Othmer, published by Interscience Encyclopedia, Inc., New York (1953).

As is taught by the above-mentioned texts, the blends of the present invention may be vulcanized with vulcanizing agents including, for example, sulfur or sulfur bearing compounds which provide sulfur under the vulcanizing conditions. Sulfur is the preferred vulcanizing agent, and it is usually used in an amount of about 0.5–3, and preferably about 1–2, parts by weight per hundred parts by weight of rubber in the blend. Zinc oxide and other metal oxides may be used in an amount of, for example, about 2–10 parts by weight per 100 parts by weight of rubber (phr.). Vulcanization accelerators such as tetramethylthiuram monosulfide, tetramethylthiuram disulfide, the zinc salt of dimethyl dithiocarbamic acid, the piperidine salt of pentamethylene dithiocarbamic acid, N,N-diethylthiocarbamyl-2-mercaptobenzothiazole and 2-mercaptozoline may be used.

Conventional fillers and pigments may be added, such as about 10–100 phr. of carbon black, finely divided silica, esterified silica, titanium dioxide, kaolin, and whiting. It is also possible to oil extend the blends. Naphthenic oils for use in processing or extending rubbery polymers are preferred, and are usually added in an amount of about 10–100 phr. and preferably about 20–80 phr. Other types of oil may be used, such as the aromatic, highly aromatic and paraffinic oils.

Vulcanization is accomplished by heating the compounded blend described above at a vulcanizing temperature and for a period of time sufficient for the vulcanization reaction to occur. A temperature of about 130–160° C. for about 10–90 minutes, and preferably about 160° C. for about 30 minutes, is often satisfactory. The specific time and temperature that are selected in a given instance will depend upon the nature of the vulcanizing agent, accelerator, and other ingredients which are present. The vulcanized blends are especially useful for specialized applications, such as in environments where a combination of ozone resistance and high physical properties are essential.

In accordance with another important variant of the invention, it has been discovered unexpectedly that when the blends contain about 20–70 parts by weight of the highly unsaturated hydrocarbon rubber, and 80–30 parts by weight of the EPDM rubber, then the blends may be used as adhesives in the preparation of rubbery polymer laminates from laminae prepared from highly unsaturated hydrocarbon rubber and low unsaturation EPDM containing less than 5 carbon-to-carbon double bonds per 1000 carbon atoms which is normally incompatible therewith. When using the blend as a laminating adhesive, it is only necessary that it be disposed between the surface areas of the laminae to be joined, and then the resulting assembly is subjected to the usual heat and pressure normally employed in effecting the vulcanization. For example, the blend may be applied to the surface of one lamina in the form of a thin sheet, or in the form of a solution in an organic solvent. Thereafter, the second lamina is applied thereover and the assembly is compressed and vulcanized. The resulting bond between the laminae is very strong due to covulcanization and the laminae do not separate under stress and strain, as is true of the prior art laminates.

Inasmuch as the unsaturated EPDM rubber is completely compatible with both the highly unsaturated hydrocarbon rubber and the low unsaturation EPDM rubber, a strong bond is formed due to covulcanization or cocure with each lamina.

As edscribed in the aforementioned copending application, the blends can be used as adhesives in the preparation of rubbery polymer laminates.

In instances where a blend is prepared from 20–70, preferably about 20–50, parts by weight of natural rubber or cis-1,4-polyisoprene, and 80–30, preferably 80–50, parts by weight of the highly unsaturated EPDM, the resulting blend may be dissolved in a hydrocarbon solvent or halogenated hydrocarbon solvent and used as a tackifying agent in preparing the laminates. For instance, it is possible to apply a solution of the blend to one or both of the surface areas of the laminae to be joined, and then press one surface upon the other. There is sufficient tackiness or adhesive action imparted to the normally non-tacky surfaces to cause the laminae to stick together with a sufficiently strong bond to allow the uncured laminate to be constructed and handled readily. At the same time, a coating of the rubber blend is provided at the bond which is compatible with both laminae and which assures covulcanization at the bond. This tackifying action, in combination with the ability to render compatible the surfaces of normally incompatible laminae, is very desirable for some purposes, such as in the manufacture of pneumatic tires. Heretofore, the lack of tact in EPDM rubber containing less than 7 carbon-to-carbon double bonds per 1000 carbon atoms, and its complete incompatibility with the highly unsaturated hydrocarbon rubbers, have been serious drawbacks in the manufacture of pneumatic tires. However, this problem has been solved by the present invention, as it is possible to simultaneously overcome both of the problems.

As further described in the aforementioned application, the blends of this invention can be used in the manufacture of pneumatic tubular tires, tire carcasses, tire side walls, tire treads, belts and the like.

The following are given by way of examples of the practice of this invention.

EXAMPLE I

This example illustrates the preparation of a highly unsaturated ethylene-propylene-5-ethylidene-2-norbornene terpolymer for use in preparing the blends of the invention.

The reaction vessel was a one-half gallon Sutherland reactor equipped with a high speed, heavy-duty, air driven motor, cooling coils, a thermometer, a temperature regulator, a pressure regulator, an injection port, and other openings where monomers, catalyst, and solvent were fed to the reactor. A tube dipping to the bottom of the reactor was present for the removal of the cement, which was produced on a continuous basis. A vapor phase vent was provided to bleed off 15% of the gaseous monomer feed to prevent inert gas buildup.

The clean reactor was assembled, rinsed with dry hexane and purged overnight with dry nitrogen. In the morning the reactor bowl was heated with a flameless blowtorch and hot water was run through the coils until the temperature in the reactor was about 70° C. After this, propylene was flushed through the reactor for about 15 minutes, the temperature was lowered to ambient, and one liter of Esso chemical grade hexane (dried over 4A molecular sieves and stored over sodium) was added to the reactor. As the temperature was brought to 30° C., propylene was fed to the reactor through a 4A molecular sieve column until 42.2 inches of mercury pressure was reached. The pressure was then brought up to 61 inches of mercury with ethylene fed through a 4A molecular sieve column and 11.9 millimoles (1.63 cc.) of pure 5-ethylidene-2-norbornene and 1.3 cc. of 1.5 molar ethylaluminum sesquichloride were added.

The monomers were shut off and the catalyst components, i.e., 0.525 molar ethylaluminum sesquichloride and 0.0543 molar vanadium oxytrichloride at a 12 to 1 aluminum to vanadium ratio, were fed into the reactor at a constant rate until a drop in the pressure in the reactor was noted. At this time the gaseous monomers were fed into the reactor through suitably calibrated rotometers at a rate of 1542 cc./minute, of which 696 cc. were ethylene and 846 cc. were propylene. The 5-ethylidene-2-norbornene was added as a 0.30 molar solution in hexane, which was also 0.009 molar in pyridine, at the rate of 3.53 cc./minute to thereby provide about 8.6 weight percent of the third monomer to be incorporated into the polymer. The polymerization was controlled by the catalyst pumps which added catalyst on demand as the pressure increased, thereby maintaining the 61 inches of mercury pressure throughout the run. When the solution became approximately 6% polymer, solvent containing 16 cc. of dissolved ethylene per cc. of solvent was fed at the rate of 26.5 cc./minute into the reactor and the polymer cement was taken off at the rate of about 90.4 g. of polymer per hour.

At this time the ethylene and propylene feeds were adjusted to 345 cc./minute and 1843 cc./minute to compensate for the unreacted monomers removed with the cement and the third monomer feed rate was adjusted to 4.9 cc./minute.

The solution cement as removed from the reactor was fed into a Waring Blendor containing water where it was intimately mixed, and then it was washed three times with equal volumes of water. The washed cement was stabilized and pre-extended with 20 parts by weight of naphthenic oil for each 100 parts by weight of rubber, and fed under nitrogen pressure into a T joint at the bottom of a 4-liter vessel filled with hot circulating water. The other end of the T was connected to a steam line and steam was admitted at a rate sufficient to superheat the rubber cement. The solvent and unreacted monomers were mostly removed by this procedure. The rubber crumb was collected on a screen, washed, and chopped up in a Waring Blendor. The rubber crumb was dried in an oven at 90° C. to remove any remaining solvent and water.

The resulting rubbery copolymer contained 62 mole percent of chemically bound ethylene by infrared analysis, using the 720 cm.$^{-1}$ absorbance for ethylene and the 968 cm.$^{-1}$ absorbance for propylene, and had a reduced specific viscosity in Decalin (0.1% at 135° C.) of 2.96. The effective unsaturation expressed in $C=C/1000$ carbon atoms was 14.5. The polymer was analyzed for unsaturation by the consumption of bromine correcting for the substitution reaction by a differential kinetic method based on the spectrophotometric method developed by Siggia et al., Anal. Chem. 35, 362 (1963).

EXAMPLE II

This example illustrates the preparation and testing of an ethylene-propylene-5-ethylidene-2-norbornene terpolymer having a double bond content of 10 per 1000 carbon atoms.

The terpolymer was prepared in accordance with the general procedure of Example I, with the exception of reducing the feed rate of 5-ethylidene-2-norbornene to provide an effective saturation level of 10 double bonds per 1000 carbon atoms.

EXAMPLE III

The following example represents the manufacture of an EPDM rubber having bound ethylene to propylene in the ratio of 83:17 and with an actual unsaturation level of about 5 carbon-to-carbon double bonds per 1000 carbon atoms.

The reaction vessel was a one-gallon Sutherland reactor equipped with a high speed, heavy-duty, air-driven motor; cooling coils; a thermometer; a temperature regulator; a pressure regulator; an injection port; and other openings where monomers, catalyst, and solvent were fed to the reactor. A tube dipping to the bottom of the reactor was present for the removal of the cement produced on a continuous basis. A vapor phase vent was provided to bleed off 15% of the gaseous monomer feed to prevent inert gas buildup.

The clean reactor was assembled, rinsed with dry hexane and purged overnight with dry nitrogen. In the morning the reactor bowl was heated with a flameless blowtorch and hot water was run through the coils until the temperature in the reactor was about 70° C. After this, propylene was flushed through the reactor for about 15 minutes; then the temperature was lowered to ambient and two liters of Esso chemical grade hexane, dried over 4A molecular sieves and stored over sodium, was added to the reactor. As the temperature was brought to 41° C., propylene was fed to the reactor through a 4A molecular sieve column until 19.7 inches Hg pressure was reached. The pressure was then brought up to 30 p.s.i. with ethylene fed through a 4A molecular sieve column and approximately 0.12 ml. pyridine inhibitor and 2.6 cc. of 1.5 M ethylaluminum sesquichloride were added.

The monomers were shut off and the catalysts, .165 molar ethylaluminum sesquichloride and .005 molar vanadium oxytrichloride at a 40 to 1 aluminum to vanadium ratio, were fed into the reactor at a constant rate until a drop in pressure in the reactor was noted. Also added 0.35 M butyl perchlorocrotonate at 7 to 1 ratio on vanadium. At this time the gaseous monomers were fed into the reactor through suitable calibrated rotometers at a rate of 2864 cc./minute, of which 2224 cc. were ethylene and 640 cc. were propylene; the termonomer 5-alkylidene-2-norbornene was added as a .33 M solution in hexane at 3.28 cc./minute which provided about 4.3 weight percent to be incorporated into the polymer. The polymerization was controlled by the catalyst pumps which added catalyst on demand as the pressure increased, thus maintaining the 30 p.s.i. pressure throughout the run. When the solution became approximately 7% polymer, solvent containing 16 cc./cc. ethylene was fed at the rate of 51.2 cc./minute into the reactor and the polymer cement taken off which produced about 180 g. of polymer per hour.

At this time the ethylene and propylene feeds were adjusted to 1601 cc./minute and 1534 cc./minute to compensate for the unreacted monomers removed with the cement.

The solution cement as removed from the reactor was fed into a Waring Blendor containing water where it was intimately mixed. The cement was then washed three times with equal volumes of water. The washed and stabilized cement (1 phr. on the rubber of the experimental stabilizer Irganox 1010 (Geigy)) was fed with nitrogen pressure into a T joint at the bottom of a 4-liter container full of hot circulating water. The other end of the T is connected to a steam line and steam was admitted at such a rate as to superheat the rubber cement. The solvent and unreacted monomers were mostly removed by this procedure. The rubber crumb was collected on a screen, washed and chopped up in a Waring Blendor. The rubber crumb was dried in the oven at 90° C. to remove any remaining solvent and water giving a rubbery copolymer which contained 84 mole percent ethylene analysis, and had a reduced specific viscosity in Decalin at 135° C. of 2.75. The unsaturation expressed in C=C/1000 carbon atoms was 4.8.

The polymer was analyzed for unsaturation by the consumption of bromine correcting for the substitution reaction by a differential kinetic method based on the spectrophotometric method developed by Siggia et al., Anal. Chem. 35, 362 (1963). Curing of the dried rubber was effected by compounding in a Brabender plasticorder (or Banbury size B mixer) based on 100 parts of oil-extended rubber (40 parts oil to 100 parts polymer), 200 parts carbon black, 135 parts of a naphthenic rubber processing oil, 5 parts of zinc oxide, 1 part of stearic acid, 3 parts methyl tuads, 0.5 part Captax, and 1.5 parts sulfur.

The hardness was determined on a Shore A durometer. Heat rise ($\Delta T°$ F.) is by the Goodrich method. The slope of the cure curve was determined on a Monsanto rheometer at 250° C.

Run 298–45–364:
```
  Ml. 1+8 min. _____    70
  Percent elong. _____   270
  300% Mod. _____p.s.i._  1175
  Tensile _____p.s.i._  1425
  Hardness _____    73
  Cure rate _____   9.8
```

EXAMPLE IV

The following example represents the preparation of an EPDM rubber having a ratio of bound ethylene to propylene of 90:10 with an unsaturation level of 2 carbon-to-carbon double bonds per 1000 carbon atoms.

The reaction vessel was a one-gallon Sutherland reactor equipped with a high speed, heavy-duty, air driven motor; cooling coils; a thermometer; a temperature regulator; a pressure regulator; an injection port; and other openings where monomers, catalyst, and solvent were fed to the reactor. A tube dipping to the bottom of the reactor was present for the removal of the cement produced on a continuous basis. A vapor phase vent was provided to bleed off 15% of the gaseous monomer feed to prevent inert gas buildup.

The clean reactor was assembled, rinsed with dry hexane and purged overnight with dry nitrogen. In the morning the reactor bowl was heated with a flameless blowtorch and hot water was run through the coils until the temperature in the reactor was about 70° C. After this, propylene was flushed through the reactor for about 15 minutes; then the temperature was lowered to ambient and two liters of Esso chemical grade hexane, dried over 4A molecular sieves and stored over sodium, was added to the reactor. As the temperature was brought to 60° C., propylene was fed to the reactor through a 4A molecular sieve column until 19.2 inches Hg pressure was reached. The pressure was then brought up to 30 p.s.i. with ethylene fed through a 4A molecular sieve column and approximately 0.12 ml. pyridine inhibitor and 2.6 cc. of 1.5 M ethylaluminum sesquichloride were added.

The monomers were shut off and the catalysts, 0.30 molar ethylaluminum sesquichloride and .009 molar vanadium oxytrichloride at 40 to 1 aluminum to vanadium ratio, were fed into the reactor at a constant rate until a drop in pressure in the reactor was noted. Also added .063 M butyl perchlorocrotonate at 7 to 1 vanadium. At this time the gaseous monomers were fed into the reactor through suitably calibrated rotometers at a rate of 2139 cc./minute, of which 1780 cc. were ethylene and 359 cc. were propylene; the termonomer ethylidene norbornene was added as a .09 M solution in hexane at 3.27 cc./minute which provided about 1.71 weight percent to be incorporated into the polymer. The polymerization was controlled by the catalyst pumps which added catalyst on demand as the pressure increased, thus maintaining the 30 p.s.i. pressure throughout the run. When the solution became approximately 5% polymer, solvent containing 16 cc./cc. ethylene was fed at the rate of 51.0 cc./minute into the reactor and the polymer cement taken off which produced about 123 g. of polymer per hour.

At this time the ethylene and propylene feeds were adjusted to 1113 cc./minute and 792 cc./minute to compensate for the unreacted monomers removed with the cement.

The solution cement as removed from the reactor was fed into a Waring Blendor containing water where it was intimately mixed. The cement was then washed three times with equal volumes of water. The washed and stabilized cement (1 phr. on the rubber of the experimental stabilizer "Irganox 1010) was fed with nitrogen pressure into a T joint at the bottom of a 4-liter container ful of hot circulating water. The other end of the T is connected to a steam line and steam was admitted at such a rate as to superheat the rubber cement. The solvent and unreacted monomers were mostly removed by this procedure. The rubber crumb was collected on a screen, washed and chopped up in a Waring Blendor. The rubber crumb was dried in the oven at 90° C. to remove any remaining solvent and water giving a rubbery copolymer which contained 90.4 mole percent ethylene by infrared analysis, and had a reduced specific viscosity in Decalin at 135° C. of 2.26. The unsaturation expressed in C=C/1000 carbon atoms was 1.7.

The polymer was analyzed for unsaturation by the consumption of bromine correcting for the substitution reaction by a differential kinetic method based on the spectrophotometric method developed by Siggia et al., Anal. Chem. 35, 362 (1963).

In the following comparative tests for elongation, tensile strength, modulus of elasticity and hardness, the dried terpolymer was compounded in a Brabender plasticorder in accordance with formulations hereinafter set forth. For comparison purposes, use was made of blends with SBR rubbers, identified by the trade name COPO 1502, which is a butadiene-styrene rubber having 23 parts by weight styrene and 77 parts by weight butadiene. The EPDM rubber in each instance was a terpolymer of ethylene, propylene and 5 - ethylidene - 2 - norbornene in which the mole ratio of ethylene/propylene was varied and in which the amount of third monomer was varied to provide EPDM rubbers having different amounts of carbonto-carbon unsaturation as shown at the bottom of the tables.

In these tabulations the C=C/1000 carbon atoms is the amount of actual unsaturation and corresponds approximately to 60% of the effective unsaturation values determined by the procedure set forth at the end of this specification.

To the present, it was believed that the C=C unsaturation in the EPDM rubber was the most significant factor in the physical properties developed between various blends. It has now been found, somewhat surprisingly, that once the blended EPDM interpolymer exceeds 70 and preferably 75 ethylene to 30 and preferably 25 propylene ratio bound in the interpolymer, a complete

TABLE I

Blends of 40 Mooney EPDM rubbers with SBR 1502

| Cure/ 320° F. | | Batch number | | | | |
|---|---|---|---|---|---|---|
| | | 4069 | 4071 | 4067 | 4066 | 4121 |
| Formulation: | | | | | | |
| SBR | | 70 | 70 | 70 | 70 | 70 |
| A. EPDM rubber | | 30 | | | | |
| B. EPDM rubber | | | 30 | | | |
| C. EPDM rubber | | | | 30 | | |
| D. EPDM rubber | | | | | 30 | |
| E. EPDM rubber | | | | | | 30 |
| Zinc oxide | | 2.5 | 2.5 | 2.5 | 2.5 | 2.5 |
| Stearic acid | | 1.25 | 1.25 | 1.25 | 1.25 | 1.25 |
| HAF black | | 60 | 60 | 60 | 60 | 60 |
| Circosol 4240 | | 22.5 | 22.5 | 22.5 | 22.5 | 22.5 |
| NOBS special | | 0.85 | 0.85 | 0.85 | 0.85 | 0.85 |
| DPG | | 0.4 | 0.4 | 0.4 | 0.4 | 0.4 |
| Sulfur | | 1.33 | 1.33 | 1.33 | 1.33 | 1.33 |
| Compound ML 1+4 (212° F.) | | 47 | 51 | 48 | 45 | 54 |
| Tensile, p.s.i. | 5' | U.C. | U.C. | 400 | 375 | U.C |
| | 10' | 1,675 | 1,950 | 2,825 | 2,925 | 2,250 |
| | 25' | 1,925 | 2,550 | 3,100 | 3,225 | 2,775 |
| Elongation, percent | | U.C. | U.C. | 850 | 760 | U.C. |
| | | 500 | 510 | 660 | 660 | 500 |
| | | 420 | 460 | 550 | 550 | 540 |
| 300% modulus, p.s.i. | | U.C. | U.C. | 200 | 175 | U.C. |
| | | 800 | 1,025 | 1,100 | 1,075 | 1,175 |
| | | 1,300 | 1,300 | 1,400 | 1,600 | 1,500 |
| Hardness, Shore A | | U.C. | U.C. | 63 | 65 | U.C. |
| | | 62 | 63 | 69 | 73 | 75 |
| | | 65 | 68 | 73 | 77 | 79 |
| C=C/1,000 of EPDM rubber | | 2.72 | 7.79 | 10.12 | 5.97 | 2.26 |
| Mole percent C₂ of EPDM rubber | | 66.5 | 63.6 | 83.6 | 88.5 | 90.4 |

See footnotes at end of Table II.

TABLE II

Blends of 70 Mooney EPDM rubbers with SBR 1502

| Cure/ 320° F. | | Batch number | | | | |
|---|---|---|---|---|---|---|
| | | 4077 | 4071 | 4075 | 4076 | 4073 |
| Formulation: | | | | | | |
| SBR | | 70 | 70 | 70 | 70 | 70 |
| E. EPDM rubber | | 30 | | | | |
| G. EPDM rubber | | | 30 | | | |
| H. EPDM rubber | | | | 30 | | |
| I. EPDM rubber | | | | | 30 | |
| J. EPDM rubber | | | | | | 30 |
| Zinc oxide | | 2.5 | 2.5 | 2.5 | 2.5 | 2.5 |
| Stearic acid | | 1.25 | 1.25 | 1.25 | 1.25 | 1.25 |
| HAF black | | 60 | 60 | 60 | 60 | 60 |
| Circosol 4240 | | 22.5 | 22.5 | 22.5 | 22.5 | 22.5 |
| NOBS special | | 0.85 | 0.85 | 0.85 | 0.85 | 0.85 |
| DPG | | 0.4 | 0.4 | 0.4 | 0.4 | 0.4 |
| Sulfur | | 1.33 | 1.33 | 1.33 | 1.33 | 1.33 |
| Compound ML 1+4 (212° F.) | | 55 | 51 | 54 | 52 | 48 |
| Tensile, p.s.i. | 5' | 75 | U.C. | 425 | 425 | 450 |
| | 10' | 1,300 | 1,950 | 2,750 | 2,600 | 2,775 |
| | 25' | 1,825 | 2,550 | 3,125 | 2,775 | 3,100 |
| Elongation, percent | | 430 | U.C. | 990 | 870 | 790 |
| | | 550 | 510 | 630 | 600 | 630 |
| | | 400 | 460 | 510 | 540 | 500 |
| 300% modulus, p.s.i. | | 75 | U.C. | 175 | 150 | 225 |
| | | 625 | 1,025 | 1,175 | 1,125 | 1,175 |
| | | 1,300 | 1,300 | 1,675 | 1,450 | 1,700 |
| Hardness, Shore A | | 51 | U.C. | 62 | 61 | 62 |
| | | 60 | 63 | 69 | 64 | 71 |
| | | 65 | 68 | 69 | 67 | 72 |
| C=C/1,000 of EPDM rubber | | 2.91 | 7.79 | 10.61 | 9.41 | 7.22 |
| Mole percent C₂ of EPDM rubber | | 61.4 | 63.6 | 80.8 | 81.9 | 88.4 |

(1) Circosol 4240 is a naphthenic extender oil; (2) NOBS special is N-oxydiethylene benzothiazole-2-sulfenamide; (3) DPG is diphenyl guanidine; (4) ML 1+4 (212° F.) is the Mooney value taken at 212° F.; (5) Tensile, elongation and 300% modulus are determined in accordance with ASTM Method D412-62T; (6) Hardness was determined with a Shore A durometer; (7) C=C/1,000 is actual unsaturation as measured by bromination procedures.

It will be observed from the foregoing that, in general, tensile strengths of the blends increase with increase in unsaturation and that the tensile strengths increase with higher ethylene levels at nearly all levels of unsaturation.

While modulus of elasticity appears to be relatively unaffected by the amount of unsaturation and ethylene ratio, when at the lower levels, the modulus of elasticity of the blend becomes somewhat dependent more on ethylene than on unsaturation at the higher ethylene ratios.

A significant change occurs in the use of EPDM rubbers having high ethylene ratios, especially in processing wherein the higher ethylene ratios require higher temperatures for sufficient compound flow for dispersion.

change occurs wherein the ethylene content becomes the important controlling factor in the development of such physical properties as tensile strength, elongation, modulus and green strength whereby the amount of unsaturation is of lesser importance so that the desired involved values can be achieved with blends of EPDM rubbers at levels as low as 2 carbon-to-carbon double bonds per 1000 carbon atoms when the interpolymer exceeds 70 and preferably 75 ethylene to 30 preferably 25 propylene ratio.

Heretofore any EPDM rubber above 80:20 ethylene/propylene was believed to be too hard to work and useless for blending purposes. It has now been found that such EPDM polymers having carbon-to-carbon double bonds ranging from 2 or more and preferably 2 to 60 carbon-to-carbon double bonds per 1000 carbon atoms of the polymer, can be highly loaded and worked in a Banbury and compounded to produce rubber blends of the type described having excellent physical and mechanical properties.

EXAMPLE V

This example illustrates the preparation of a pneumatic tire from EPDM rubber using the principles of the invention.

A total of four tire cord reinforced rubber plies are prepared from a matrix rubber compounded from, on a weight basis, 60 parts of an ethylene-propylene-5-ethylidene-2-norbornene terpolymer having an effective unsaturation level of 15 carbon-to-carbon double bonds per 1000 carbon atoms, 40 parts of natural rubber, 75 parts of semi-reinforcing carbon black, 17 parts of naphthenic oil, 5 parts of zinc oxide, 1 part of stearic acid, 0.8 part of N-oxydiethylene benzothiazole-2-sulfenamide, 0.4 part of diphenylguanidine, and 1.2 parts of sulfur. The formulation is thoroughly mixed in conventional Banbury-type mixing equipment. Each of the four plies is formed by calendering the compounded rubber composition onto wefted nylon tire cord which has been rubberized by dipping into a prior art resorcino-formaldehyde vinyl pyridine latex, followed by drying. The plies are cut to the length necessary for manufacturing the tire.

A pneumatic tire is constructed from the plies formed above, annular bead reinforcements, an inner liner, a tire tread and sidewall extrusion, following prior tire building practices. An inner liner composed of chlorobutyl rubber is laid upon a tire building drum. Then, the first of the four cord reinforced rubber plies is superimposed upon the inner liner, the ends thereof are fastened around the bead reinforcement, and the remaining three plies are superimposed thereupon to form the carcass. Finally, a specially coated tire tread composed of an ethylene - propylene - 5-ethylidene-2-norbornene terpolymer having an effective unsaturation level of 3.5 carbon-to-carbon double bonds per 1000 carbon atoms is superimposed on top of the carcass. The surface of the tire tread which is contacted by the carcass has a special tackifying layer thereon of the same blend which is used in preparing the plies for the carcass.

The tire tread is prepared from a compounded stock containing the EPDM rubber having an effective unsaturation level of 3.5 carbon-to-carbon double bonds per 1000 carbon atoms in an amount of 100 parts by weight, and in combination therewith on a weight basis 80 parts intermediate super abrasion carbon black, 55 parts of naphthenic oil, 5 parts of zinc oxides, 1 part of stearic acid, 1.5 parts tetramethylthiuram monosulfide, and 0.75 part by weight of 2-mercaptobenzothiazole, and 1.5 parts of sulfur. The ingredients comprising the tire tread formulation are mixed in a Banbury mixer in accordance with conventional practice, and then the tire tread is extruded through a die likewise following conventional practice. At the time of extruding the tire tread, a compatible, tackifying layer of the blend used in preparing the plies is applied in the form of a cement, which is a solution of the blend in hexane. The cement is applied in an amount sufficient to form a thin, but continuous layer over the surface of the tire tread which normally contacts the carcass.

The assembly is stitched down, and then placed in a prior art mold for vulcanizing the tire. The assembly is cured in a mold at 320° F. for 20 minutes. The resulting tubeless tire includes a carcass which has a plurality of plies tightly adhering each to the other, with the inner ply tightly adhering to the butyl innerliner and outer ply tightly adhering to the tire tread. Upon testing, the tire carcass is found to be very strong. There is no tendency for the plies to separate, nor for the tread to separate from the carcass. The rubber is found to adhere tenaciously throughout the various laminae.

The elastomers described herein may be analyzed as set out below to determine the effective unsaturation level by the consumption of bromine correcting for the substitution reaction by a differential kinetic method based on the spectrophotometric method developed by Siggia et al., Anal. Chem. 35, 362 (1963). The basis of the method is the determination of the differences in rates of addition and substitution of bromine ($Br_2$) with ethlenically unsaturated linkages. The rate of reaction is determined by monitoring the disappearance of the bromine photometrically as a function of time. A sharp break occurs when the rapid addition reaction to the carbon-to-carbon double bonds is complete and the slow substitution reaction continues. Extrapolation of a kinetic plot (pseudo first order) to a time of "0" will give the amount of bromine remaining after addition to the carbon-to-carbon double bonds was complete. The change in bromine concentration is taken as the measure of the effective unsaturation level in the elastomer.

Materials (1) Bromine solution, 0.0125 molar in $CCl_4$ (2.0 g. of $Br_2$/liter of $CCl_4$).

(2) Aqueous potassium iodide solution containing 10 grams of KI in 100 ml. of water.

(3) Mercuric chloride catalyst solution containing 0.2 g. of mercuric chloride dissolved in 100 ml. of 1,2-dichloroethane.

(4) Starch indicator solution.

(5) Aqueous sodium thiosulfate solution, 0.01 Normal accurately standardized.

(6) Carbon tetrachloride, reagent grade.

(7) Spectrophotometer (visible range) having sample and reference cells that can be stoppered.

(8) Stopwatch (if a non-recording photometer is used).

Calibration (1) With the standard 0.01 $N_2Na_2S_3O$ solution, titrate to the starch-iodine endpoint duplicate 10.00 ml. samples of the 0.0125 M bromine solution to which 5 ml. of the 10% KI solution and 25 ml. of distilled water have been added.

(2) From the standard 0.0125 M bromine solution, prepare a series of five calibration standards of the following concentrations: 0.5, 1, 2, 3, and 4 millimoles of $Br_2$/liter.

(3) Determine the absorbance in the sample cell of each of the five calibration standards at a wavelength setting of 415 m$\mu$ [1] versus $CCl_4$ in the reference cell. Then prepare a plot from the resulting data of absorbance versus the exact concentration of $Br_2$ contained in the calibration standards, plotted as millimoles of $Br_2$/liter, to obtain a calibration curve.

(4) Determine the slope of the calibration curve thus obtained for use in the equation:

$$Br_2 \text{ in millimoles/liter} = \text{Absorbance} \times \frac{1}{\text{slope of calibration curve}}$$

Analysis (1) Dissolve about 1.25 grams of the dry polymer to be analyzed in 50 ml. of $CCl_4$ (or take sufficient polymer cement to contain about 1.25 grams of the polymer). Precipitate the polymer by pouring the solution into 400 ml. of isopropyl alcohol with vigorous stirring provided by a Waring Blendor.

(2) Filter the precipitated polymer and squeeze out the excess liquid.

---
[1] The spectrophotometer should be adjusted to the wavelength setting of maximum absorption since the bromine absorption curve is very sharp and even small errors in the wavelength setting cannot be tolerated.

(3) Dissolve the once precipitated polymer from Step 2 in 50 ml. of CCl₄, precipitate the polymer again by pouring into 400 ml. of isopropyl alcohol as in Step 1, and filter and remove excess liquid as in Step 2.

(4) Immediately redissolve the twice precipitated undried polymer from Step 3 in about 50 ml. of CCl₄ in a Waring Blendor. Filter the solution through glass wool into a 2-ounce narrow-mouthed bottle that can be stoppered to prevent evaporation. Determine the solids content by evaporation of duplicate 5.0 ml. samples of the polymer solution. A hypodermic syringe is convenient for measuring the polymer solutions.

(5) Set the spectrophotometer at the wavelength of 415 m$\mu$.

(6) Check the concentration of the 0.0125 M bromine solution daily before use by determining the absorbance of a known dilution.

(7) To the sample photometer cell, add 1.00 ml. of the 0.2% HgCl₂ solution as a catalyst, and 1.00 ml. of the standard 0.0125 M solution of bromine in CCl₄.

(8) Prepare a polymer blank by adding to the reference cell 1.00 ml. of the polymer solution from Step 4, 1.00 ml. of CCl₄ and 1.00 ml. of the 0.2% HgCl₂ solution, shake well, and place the photometer reference cell in the instrument.

(9) Discharge 1.00 ml. of the polymer solution [2] into the photometer cell containing the catalyst and bromine solution from a hypodermic syringe starting the stopwatch the instant of mixing (or the recorder if a recording spectrophotometer is used). Stopper the cell and thoroughly agitate the mixture before placing the cell in the instrument.

(10) Record the 415 m$\mu$ wavelength absorbance of the mixture at one minute intervals. Continue recording time and absorbance values until the faster addition rate of bromine to the double bonds is complete and the slower substitution reaction is well defined. (Usually 10–15 minutes is sufficient.) Prepare a plot from the resulting data of absorbance versus time to obtain an adsorbance curve for the analyzed sample.

Calculations (1) Extrapolate the linear portion of the absorbance curve (i.e., the portion for the substitution reaction) for the analyzed sample to zero time,[3] and record the absorbance value for zero time.

(2) Determine the final Br₂ concentration by inserting the absorbance value at zero time which was obtained above, and the slope of the calibration curve, in the following equation. The final Br₂ concentration, which is the concentration of Br₂ at the end of the rapid addition, reaction, is then calculated.

$$\text{Final Br}_2 \text{ concentration in millimoles/liter} = \text{Absorbance at zero time} \times \frac{1}{\text{slope of calibration curve}}$$

(3) Calculate the effective unsaturation level as carbon-to-carbon double bonds per 1000 carbon atoms in the polymer from the following equation:

$$\text{Effective unsaturation level expressed as carbon-to-carbon double bonds per 1000 carbon atoms in the polymer} = \frac{(A-B)(C)(14)(100)}{(1000)(D)(E)}$$

---

[2] The sample size selected will permit analysis of polymers containing 1 to 5 C=C/1000 carbon atoms. Polymers with unsaturation levels above this range can be analyzed but the polymer concentation must be reduced proportionately.

[3] Extrapolation of the absorbance curve for the sample being analyzed gives essentially the same results as extrapolation of a kinetic plot but with a considerable saving in time.

Where
A=initial Br₂ concentration, millimoles/liter
B=final Br₂ concentration, millimoles/liter
C=milliliters of solution in the sample photometer cell
D=percent solids of polymer in the polymer solution (based on the weight of the polymer in grams/volume of the solvent in milliliters)
E=milliliters of the polymer solution in the sample photometer cell.

I claim:
1. A sulfur vulcanizable blend of rubbery polymers comprising about 5–95 parts by weight of a rubbery hydrocarbon polymer selected from the group consisting of natural rubber, styrene-butadiene rubber, polybutadiene rubber, polyisoprene rubber and mixtures thereof, and 95–5 parts by weight of a rubbery interpolymer which is the product of the interpolymerization of ethylene, at least one straight chain monoolefin containing 3–16 carbon atoms and an alkylidene norbornene having from 2–20 carbon atoms in the alkylidene group, the rubbery interpolymer having a mole ratio of chemically bound ethylene to the monoolefin containing 3–16 carbon atoms which exceeds 80:20 but is less than 95:5 and containing at least 2 carbon-to-carbon double bonds per 1000 carbon atoms.

2. The blend of claim 1 wherein the said rubbery interpolymer is present in an amount of about 15–30 parts by weight for each 85–70 parts by weight of the rubbery hydrocarbon polymer.

3. The blend of claim 1 wherein the rubbery hydrocarbon polymer is present in an amount of about 20–70 parts by weight for each 80–30 parts by weight of the rubbery interpolymer.

4. The blend of claim 1 wherein the hydrocarbon polymer is styrene-butadiene rubber.

5. The blend of claim 1 wherein the hydrocarbon polymer is styrene-butadiene rubber and the said interpolymer is present in an amount of about 15–30 parts by weight for each 85–70 parts by weight of the styrene-butadiene rubber.

6. The blend of claim 1 wherein the said rubbery interpolymer is the product of the interpolymerization of ethylene, propylene and 5-ethylidene-2-norbornene.

7. The blend of claim 6 wherein the said rubbery interpolymer contains about 2–25 carbon-to-carbon double bonds per 1000 carbon atoms.

8. The vulcanizate obtained by vulcanizing the blend of claim 1 with sulfur.

9. The vulcanizate of claim 8 wherein the said rubbery interpolymer is present in an amount of about 15–30 parts by weight for each 85–70 parts by weight of the rubbery hydrocarbon polymer.

10. The vulcanizate of claim 9 wherein the hydrocarbon polymer is styrene-butadiene rubber.

11. The vulcanizate of claim 8 wherein the said rubbery interpolymer is the product of the interpolymerization of ethylene, propylene and 5-ethylidene-2-norbornene.

12. The vulcanizate of claim 11 wherein the hydrocarbon polymer is styrene-butadiene rubber and the said rubbery interpolymer is present in an amount of about 15–30 parts by weight for each 85–70 parts by weight of the rubbery hydrocarbon polymer.

13. A sulfur vulcanizable blend as claimed in claim 1 in which the blend is cured with a rubber curing agent.

14. A sulfur vulcanizable blend of rubbery polymers comprising about 5–95 parts by weight of a rubbery hydrocarbon polymer selected from the group consisting of natural rubber, styrene-butadiene rubber, polybutadiene rubber, polyisoprene rubber and mixtures thereof, and 95–5 parts by weight of a rubbery interpolymer which is the product of the interpolymerization of ethylene, at least one straight chain monoolefin containing 3–16 carbon atoms and an alkylidene norbornene having from 2 to 20 carbon atoms in the alkylidene group, the rubbery interpolymer having a mol ratio of chemically bound ethylene to the monoolefin containing 3–16 carbon atoms between 80:20 and 20:80 and containing less than 7 but at least 2 carbon-to-carbon double bonds per 1000 carbon atoms.

15. The blend of claim 14 wherein the said rubbery interpolymer is present in an amount of about 15–30 parts by weight for each 85–70 parts by weight of the rubbery hydrocarbon polymer.

16. The blend of claim 14 wherein the rubbery hydrocarbon polymer is present in an amount of about 20–70 parts by weight for each 80–30 parts by weight of the rubbery interpolymer.

17. The blend of claim 14 wherein the hydrocarbon polymer is styrene-butadiene rubber.

18. The blend of claim 14 wherein the hydrocarbon polymer is styrene-butadiene rubber and the said interpolymer is present in an amount of about 15–30 parts by weight for each 85–70 parts by weight of the styrene-butadiene rubber.

19. The blend of claim 14 wherein the said rubbery interpolymer is the product of the interpolymerization of ethylene, propylene and 5-ethylidene-2-norbornene.

20. The blend of claim 19 wherein the hydrocarbon polymer is selected from the group consisting of natural rubber and cis-1,4-polyisoprene and the hydrocarbon polymer is present in an amount of about 20–50 parts by weight for each 80–50 parts by weight of the hydrocarbon polymer.

21. The vulcanizate obtained by vulcanizing the blend of claim 14 with sulfur.

22. The vulcanizate of claim 21 wherein the said rubbery interpolymer is present in an amount of about 15–30 parts by weight for each 85–70 parts by weight of the rubbery hydrocarbon polymer.

23. The vulcanizate of claim 22 wherein the hydrocarbon polymer is styrene-butadiene rubber.

24. The vulcanizate of claim 21 wherein the said rubbery interpolymer is the product of the interpolymerization of ethylene, propylene and 5-ethylidene-2-norbornene.

25. The vulcanizate of claim 24 wherein the hydrocarbon polymer is styrene-butadiene rubber and the said rubbery interpolymer is present in an amount of about 15–30 parts by weight for each 85–70 parts by weight of the rubbery hydrocarbon polymer.

26. A sulfur vulcanizable blend as claimed in claim 14 in which the blend is cured with a rubber curing agent.

References Cited
UNITED STATES PATENTS 3,151,173   9/1964   Nyce _____ 260—666

MURRAY TILLMAN, Primary Examiner

C. SECCURO, Assistant Examiner

U.S. Cl. X.R.

260—5, 23.7 C, 23.7 M, 33.6 AQ, 33.6 PQ, 33.6 UQ, 41.5 R, 41.5 A, 79.5 B, 80.78

UNITED STATES PATENT OFFICE
CERTIFICATE OF CORRECTION

Patent No. 3,646,169          Dated February 29, 1972

Inventor(s) Kenneth H. Wirth

It is certified that error appears in the above-identified patent and that said Letters Patent are hereby corrected as shown below:

Column 11, Table II, 3rd line, "E" should read -- F --.

Signed and sealed this 15th day of August 1972.

(SEAL)
Attest:

EDWARD M. FLETCHER, JR.
Attesting Officer

ROBERT GOTTSCHALK
Commissioner of Patent

Disclaimer 3,646,169.—*Kenneth H. Wirth*, Baton Rouge, La. SULFUR VULCANIZABLE ELASTOMERIC BLENDS COMPRISING DIOLEFIN RUBBER AND EPDM TERPOLYMERS. Patent dated Feb. 29, 1972. Disclaimer filed Aug. 12, 1971, by the inventor and the assignee, *Copolymer Rubber & Chemical Corporation.*

Hereby disclaims the portion of the term of the patent subsequent to Jan. 27, 1987.

[*Official Gazette May 22, 1973.*]